United States Patent [19]

Ruffinatti

[11] Patent Number: 4,648,316

[45] Date of Patent: Mar. 10, 1987

[54] MACHINE FOR PREPARING A SEMI-FINISHED CONFECTIONERY PRODUCT

[75] Inventor: Giovanni Ruffinatti, Giaveno, Italy

[73] Assignee: Ruffinatti S.r.l., Bruino, Italy

[21] Appl. No.: 719,389

[22] Filed: Apr. 2, 1985

[30] Foreign Application Priority Data

Apr. 2, 1984 [IT] Italy ............................ 67324 A/84

[51] Int. Cl.$^4$ .............................................. A23P 1/00
[52] U.S. Cl. .................................... 99/483; 99/450.1; 99/450.2; 99/451; 425/363
[58] Field of Search ............... 99/451, 450.1, 450.2, 99/483, 485, 450.7; 425/363, 366, 365, 374; 426/512, 517, 518, 500, 502

[56] References Cited

U.S. PATENT DOCUMENTS 3,698,309 10/1972 Steels ................................. 99/450.1
3,804,637 4/1974 Rejsa ................................. 99/450.1

Primary Examiner—Timothy F. Simone
Attorney, Agent, or Firm—Sughrue, Mion, Zinn, Macpeak and Seas

[57] ABSTRACT

A machine comprises an extruder substantially in the form of a hopper, with a loading aperture for the introduction and accumulation of a strand comprising a sweet outer part which is in a plastic state but can crystallize on cooling, and which surrounds a core constituted by a filling. The extruder also has a drawing aperture towards which, in use, the accumulated strand descends under gravity to form a sweet plastic surface layer, and through which this is drawn. The inner walls of the extruder comprise surfaces which are movable so as to exert on the sweet surface layer of this mass a massaging action which tends to impart to this surface layer a flowing movement substantially in the direction of extrusion, so as to resist the tendency of the surface layer to crystallize.

13 Claims, 18 Drawing Figures

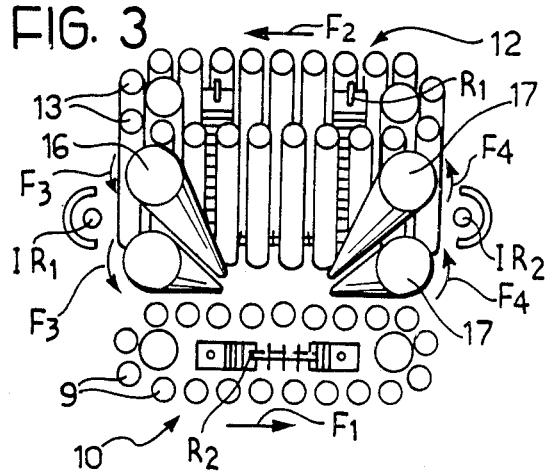
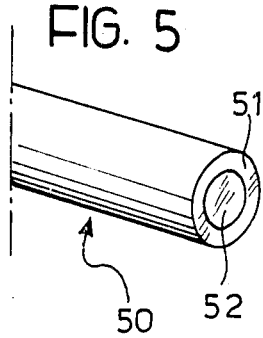
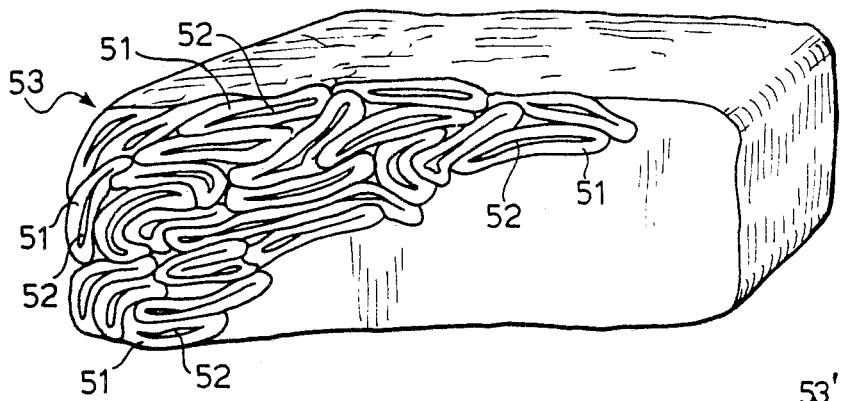
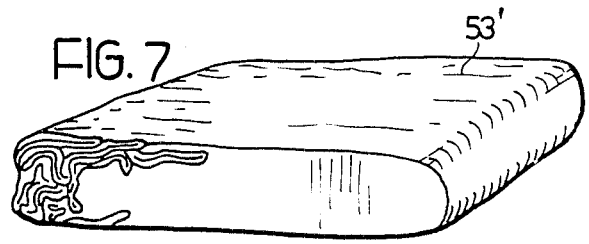
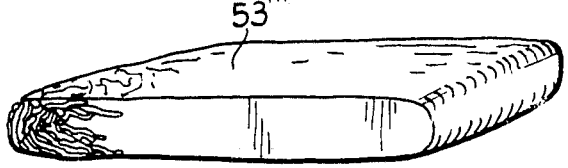

MACHINE FOR PREPARING A SEMI-FINISHED CONFECTIONERY PRODUCT

BACKGROUND OF THE INVENTION

The present invention relates to a machine for preparing a semi-finished confectionery product comprising a sweet outer layer within which thin sweet layers alternate with randomly oriented thin layers of a filling, and usable particularly for making sweets with a crumbly filling of the type known in English as "honeycomb" or in French as "feuillete", and the like. In particular, the machine according to the invention is intended to allow this semi-finished product to be prepared from a strand comprising a sweet outer part which is in a plastic state but can crystallize on cooling, and which surrounds a core constituted by the filling.

The filling may be constituted, for example, by a glucose and fruit syrup, a thick hazelnut or peanut paste, effervescent powder, etc.

According to the prior art, this type of semi-finished confectionery product is prepared in the following manner. A layer of sweet paste is prepared, which is then laid on a heated surface. The desired type of filling is poured onto this layer. The layer is then folded over on itself and its edges are sealed together in such a way as to form a closed envelope. The envelope is then repeatedly stretched and folded on itself for a number of times sufficient to create the desired number of layers. The heterogeneous mass thus compacted is then fed, still in a plastic state, to forming machines (cutters or moulders) for the production of, for example, sweets or bars. The sweets or bars thus obtained have a noticeable crumbliness when chewed, which is derived from their structure of very thin crystalline sweet layers or lamina in close-packed alternation with layers of filling. This crumbliness makes these products particularly pleasant.

The art described above does not prove completely satisfactory for the following reasons. In the first place, the formation of the semi-finished layered confectionery product by means of manual compaction takes a considerable time and therefore involves high costs. Furthermore, this operation requires considerable manual dexterity. The operation of manually compacting and forming the layered heterogeneous mass proves somewhat critical, since it is necessary to avoid at all costs a premature crystallization of the sweet layers, particularly the sweet outer surface layer which serves as an envelope for this mass.

SUMMARY OF THE INVENTION

The object of the present invention, therefore, is to provide a machine which allows the "mechanisation" of the aforesaid operation for preparing the semi-finished product described above, and which, in particular, allows a higher and more economical output and, at the same time, a high standard of quality for the product.

According to the invention, this object is achieved by a machine characterised in that it comprises an extruder substantially in the form of a hopper, with a loading aperture for the introduction and accumulation of a filled strand and a drawing aperture towards which, in use, the accumulated strand descends under gravity to form a heterogeneous mass with a sweet plastic surface layer, and through which the strand is drawn; the inner walls of the extruder comprising surfaces which are movable so as to exert on the sweet surface layer of this mass a massaging action which tends to impart to this surface layer a flowing movement substantially around the direction of extrusion of the mass; drive means being provided to effect the movement of these surfaces when actuated.

The massaging action effectively resists the tendency of the outermost sweet surface layer of the mass to crystallize during extrusion. In fact, if this layer were to crystallize during extrusion, it could break and the filling could squirt through the fractures thus created, with an ensuing decline in the quality of the product. Such an eventuality is avoided with the invention by virtue of the massaging action of the movable surfaces, which tends to keep the outer surface layer of the mass in a plastic state during extrusion.

Further characteristics and advantages of the machine according to the invention will become apparent from the detailed description which follows with reference to the appended drawings.

BRIEF DESCRIPTION OF THE DRAWINGS

FIG. 3 illustrates schematically the arrangement and the functioning of a hopper-extruder with movable sides, forming part of the machine according to the invention;

FIGS. 5 to 9 show respectively a filled sweet strand from which the semi-finished product described above is made with the machine according to the invention, the structure of three intermediate products obtained in the installation shown in FIG. 4, and the semi-finished product obtained at the output of the installation of FIG. 4;

DETAILED DESCRIPTION OF THE INVENTION

Figure 1:
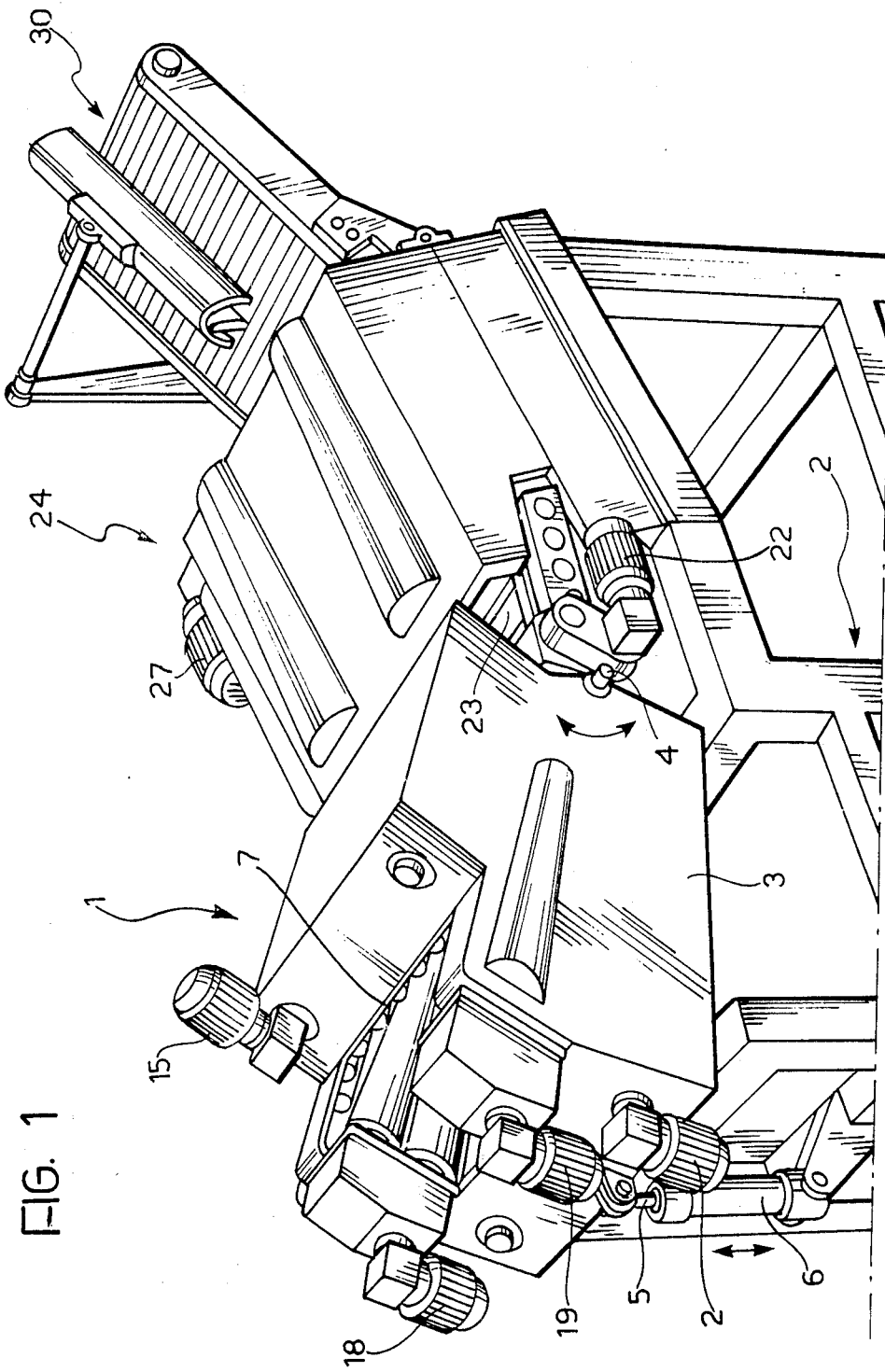
FIG. 1 is a perspective view of a machine according to the invention.
Figure 2:
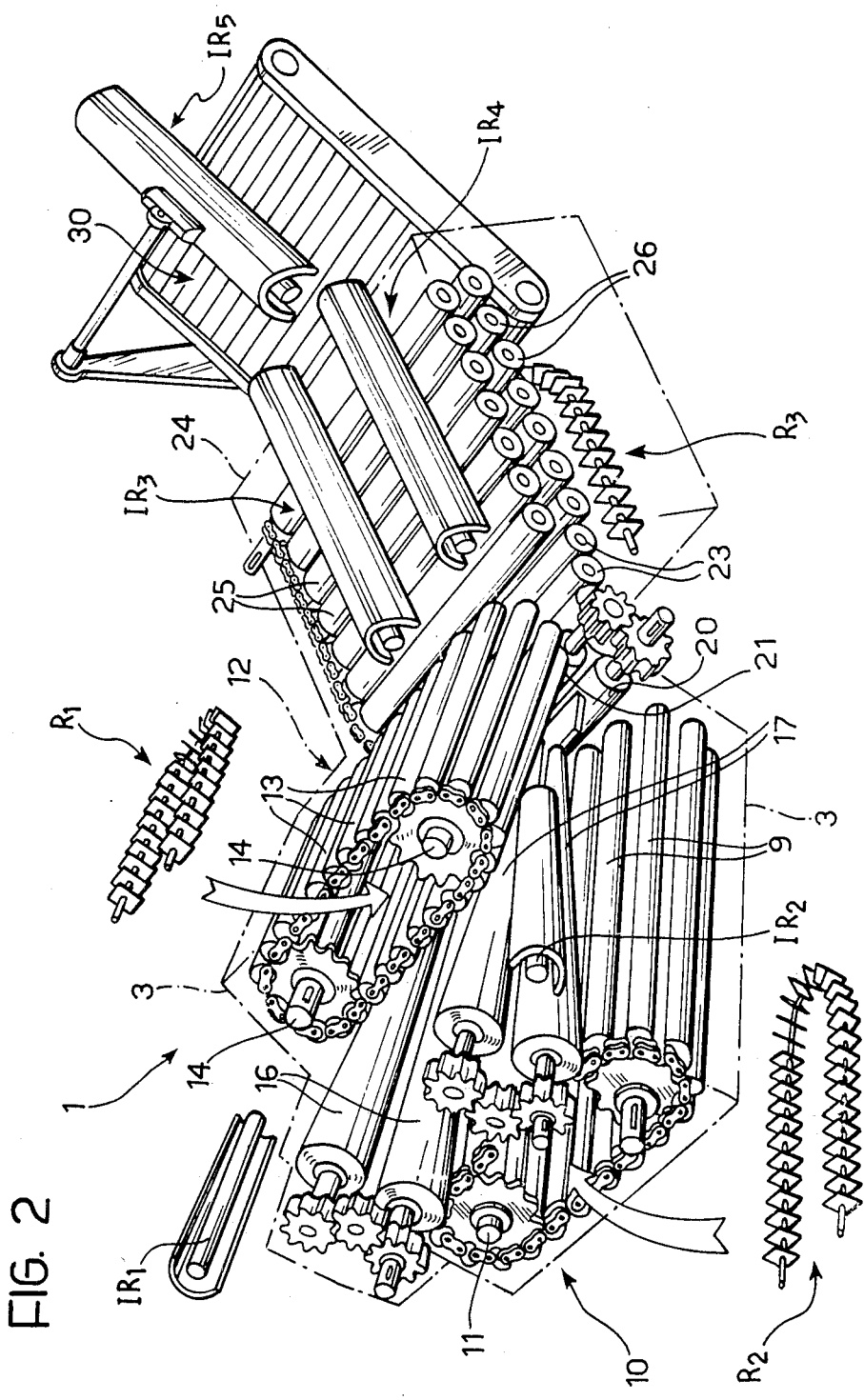
FIG. 2 is a perspective view of some parts of the machine of FIG. 1.
Figure 4:
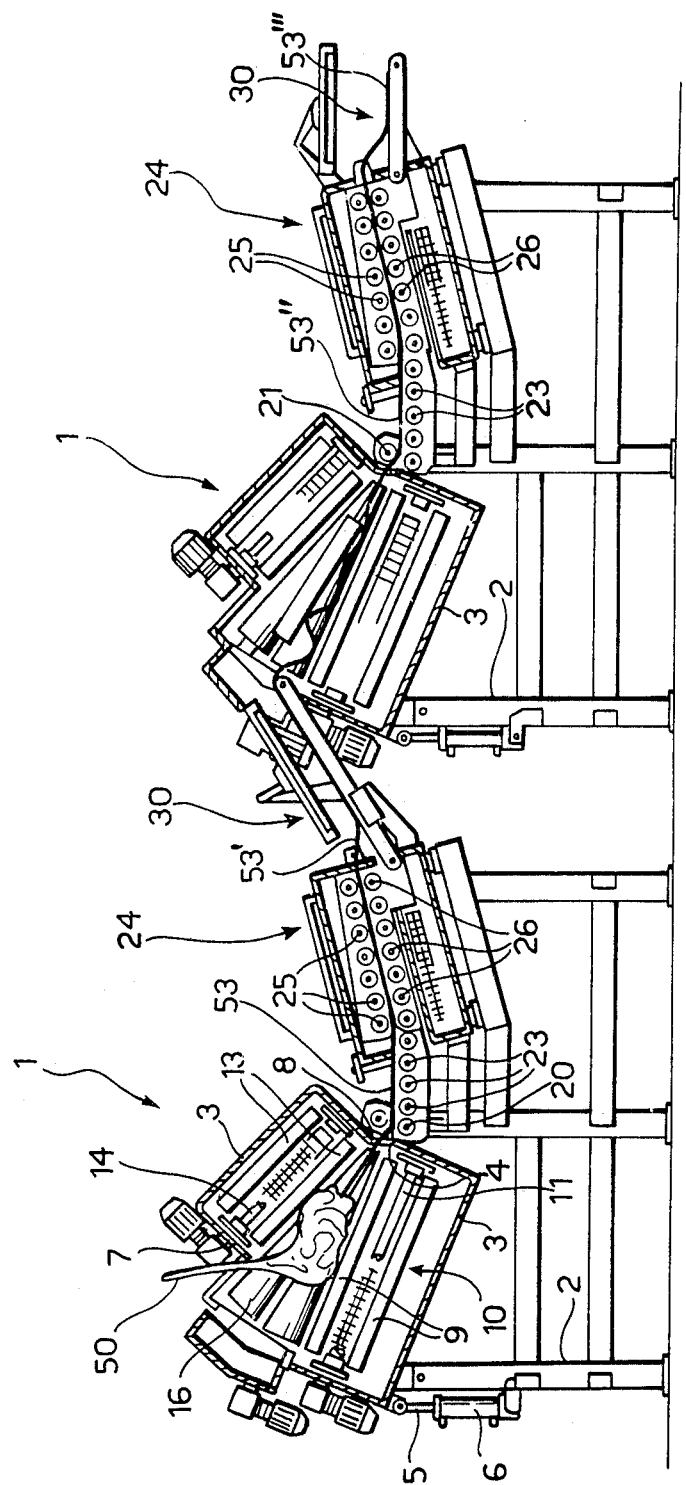
FIG. 4 shows schematically, in a partially sectioned side view, an installation comprising two machines according to the invention arranged in cascade.

With reference to FIGS. 1, 2 and 4, a machine according to the invention comprises an extruder 1 supported by a frame, generally indicated 2. The extruder 1 comprises a casing 3 rotatably articulated on the frame 2 about pivots 4 at one side. At its opposite side, the casing 3 is connected to the rod 5 of a hydraulic or pneumatic cylinder 6 supported by the frame 2 and able to cause, through a vertical displacement of the rod, a corresponding rotation of the casing 3 about the pivots 4.

The casing 3 of the extruder has a main or loading aperture 7 and, at its opposite end, an output aperture 8 (FIG. 4).

Within the casing 3, as shown in particular in FIGS. 2 and 4, is arranged a first plurality of rollers 9 which are cylindrical, parallel and connected together in such a way as to form a closed chain, generally indicated 10, extending between a pair of parallel shafts 11. In the example illustrated, these shafts carry, at their respective ends, toothed wheels while engage the chain links interconnecting, in an entirely conventional manner, the ends of the rollers 9, which are freely rotatable about their respective axes. The shafts 11 of the chain of rollers 10 are supported rotatably by the casing 3 of the extruder. An electric drive motor 12 (FIG. 1) mounted on the outside of the casing 3 and connected to one of the shafts 11 circulates the chain of rollers 10 when actuated.

Within the chain of rollers 10 there is arranged a resistance R1 provided with dissipation fins and supported by the casing.

A further closed chain of rollers, generally indicated 12, is arranged within the casing 3 above the chain of rollers 10. This chain is formed by rollers 13 which are shorter than the rollers 9 and are also connected, so as to be rotatable about their respective axes, to end chains extending between gears carried by a pair of parallel shafts 14 supported by the casing 3. A further electric motor 15 (FIG. 1) carried by the casing 3 and coupled to one of the shafts 14 circulates the upper chain of rollers 12 when actuated.

Within the chain of rollers 12 is a further resistance R2 which is exactly the same as that described above.

As shown particularly in FIG. 4, the axes of the shafts 11 and the axes of the shafts 14 converge towards the output aperture of the casing 3 at an angle to each other.

Respective pairs of conical rollers 16, 17 are mounted in the casing 3 between the corresponding ends of the chains of rollers 10, 12. The rollers of each pair are arranged in superposition, with their respective axes converging towards the output aperture 8 of the casing 3. They are rotatably mounted on the casing and can be rotated in the same direction by means of conventional reduction gears and electric motors 18, 19 mounted on the casing.

The conical rollers of each pair of rollers are located a short distance apart, immediately adjacent the ends of the chains of rollers 10 and 12. As shown in FIG. 3 in particular, the facing portions of the two chains of rollers and the conical rollers define, within the extruder, a substantially frustopyramidal zone open towards the loading aperture 7 of the casing at its larger end, and towards the output aperture 8 of the casing at its smaller end.

A respective candle-like heat lamp IR1, IR2, with its respective reflector-screen, is positioned between each pair of rollers 16, 17 and the casing to radiate heat towards the region between these pairs of rollers.

During operation, the motors 11, 15, 18 and 19 are actuated in such a way as to rotate the conical rollers 16, 17 and the chains of rollers 10, 12 in the same direction, for example as indicated by the arrows $F_1$ to $F_4$ in FIG. 3.

The chains of rollers 10, 12 and the conical lateral rollers 16, 17 together form a kind of hopper with sides that are movable in the direction of the aforesaid arrows by the actuation of the motors.

In operation, a filled strand, for example of the type indicated 50 in FIG. 5, is fed to the extruder 1. The strand 50 has a substantially circular section with a diameter of about a centimetre, and has a sweet outer part which is heated and in a plastic state but can crystallize on cooling, and which surrounds a core 52 constituted by a filling.

The strand 50 comes from a strand-making machine and is introduced into the extruder 1 through the loading aperture 7 of casing 3. Preferably, the casing 3 is kept in a lowered position at the start of operation, so that the lower chain of rollers 10 is substantially horizontal. A quantity of strand may thus settle and accumulate on this chain of rollers, forming convolutions or adjacent whorls in a substantially random manner and building up a heterogeneous plastic mass. Once a sufficient quantity of strand has been accumulated on the lower chain of rollers 10, the casing 3 is raised by means of the cylinder 6 until it reaches substantially the position illustrated in FIGS. 1 and 4, whereby this lower chain of rollers is inclined downwardly in the direction of the output aperture of the casing. In the meantime, the strand continues to be fed to the extruder. The mass of accumulated strand tends to descend under gravity towards the output aperture 8 between the chains of the rollers 10, 12 and the conical rollers 16, 17, which are rotating. During this descent, the mass is irradiated with heat by the resistances R1, R2 and the lamps IR1, IR2, and undergoes a progressive reduction in section until in correspondence with the output aperture 8 of the casing 3. The opening defined by the ends of the conical rollers 16, 17 and the chains of the rollers 10, 12 adjacent this output aperture of the casing, therefore, actually functions as a drawing aperture and has a substantially rectangular section, as shown in FIG. 3.

As the accumulated strand gradually descends through the extruder 1, a sweet plastic surface layer builds up on the mass due to the melting and coalescence of the outer parts of the loops or convolutions at the periphery of this mass.

The circulation of the chains of the rollers 10, 12 and the rotation of the rollers 16, 17 (for example, in the direction indicated in FIG. 3) cuases a massaging action to be exerted on this sweet surface layer of the mass, which tends to impart to the surface layer as flowing movement substantially in the direction of descent of this mass, in the opposite direction to that of the rotation of the chains of rollers and the conical rollers. This massaging action, together with the heating action of the resistances and lamps described above, resists the tendency of the sweet surface layer to crystallize and keeps it plastic.

Thus, a plastic drawn product 53 emerges from the extruder 1 through the output aperture 8 of the casing 3, having, in cross-section, substantially a structure of the type shown in FIG. 6. One is therefore dealing with a substantially rectangular-sectioned drawn product with an almost stratified structure in which, as a result of the squashing and compacting of the various portions of the initial strand 50, it is possible to discern a plurality of thin sweet layers deriving from the deformation of the outer part of the strand 50, which are oriented randomly and alternate with thin layers of filling deriving from the deformation of the core 52 of the original strand.

The drawn product 53 emerging from the output aperture 8 of the extruder 1 passes between a pair of extractor rollers 20, 21 (FIGS. 2 and 4) supported by the frame 2 transverse the direction of extrusion and driven by a motor, indicated 22 in FIG. 1. The extractor rollers 20, 21 are followed by a bed of conveyor rollers 23, whereby the drawn product 53 is fed to a section-reducing station, generally indicated 24.

The latter comprises substantially two arrays of rollers or cylinders 25, 26 which oppose each other at progressively decreasing distances. These cylinders are rotated by means of a motor, indicated 27 in FIG. 1. Two heat lamps IR3, IR4 (each with their respective reflector-screens) are disposed above the cylinders 25 to irradiate the drawn product which passes between these cylinders and the underlying cylinders 26. Beneath the latter is a finned resistance R3. The cylinders 25, 26 draw the drawn product 53 to cause a gradual reduction in its thickness, and the drawn product $53^I$ emerging from the station 24 has substantially the appearance and structure shown in FIG. 7: the various thin sweet and filling layers have been made yet thinner.

Typically, the drawn product 53 emerging from the extruder 1 may have a width of between 80 and 120 mm and a depth of between 30 and 40 mm.

The drawn product $53^I$ emerging from the section-reducing station 24 has a typical thickness of between 6 and 15 mm.

An endless conveyor belt of known type, generally indicated 30 in the drawings, is provided at the output of the section-reducing station 24 and above it is located a further heat lamp IR5 carried by an arm 31 fixed to the frame 2.

The drawn product $53^I$ may therefore be fed directly to forming machines, for example moulders or cutters, for the production of confectionery bars or sweets in an enterily conventional manner.

The Applicant has also found that a considerable improvement in the final result can be achieved by arranging two machines of the aforesaid type in cascade, as shown in FIG. 4, and thus subjecting the drawn product $53^I$ to the same processes in a second machine as those to which the initial strand 50 was subjected in the first machine. According to this mode of operation, by means of the conveyor belt 30 of the first machine, the drawn product $53^I$ is fed to and accumulated in the hopper-extruder of the subsequent machine. After accumulating there, it forms a mass which is drawn, then extracted and again reduced in section, in order to assume, at the output of the section-reducing station 24 of the second machine, the structure illustrated in FIG. 9. Thus, the final drawn product $53^{III}$ shown in this drawing reveals, in cross-section, a layered or laminated structure that is decidedly closerpacked.

The final product (sweet, confectionery bar or the like) thus obtained reveals, after crystallization of the very thin sweet layers constituting the structure or matrix thereof, a very pronounced crumbliness when chewed and therefore proves to be extremely pleasant.

Figure 10:
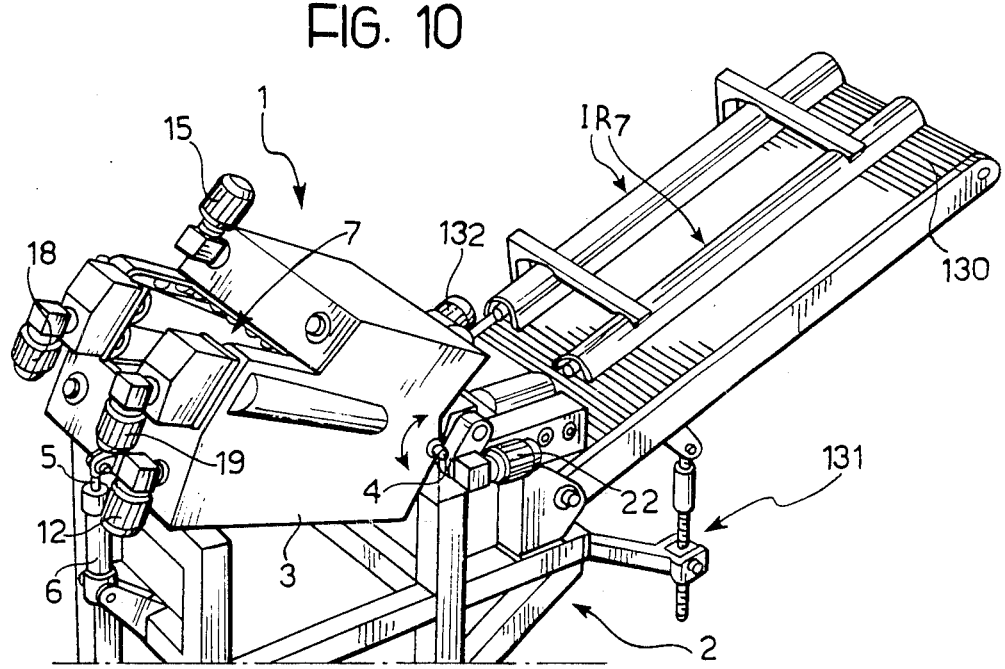
FIG. 10 is a perspective view of another embodiment of the machine according to the invention.
Figure 11:
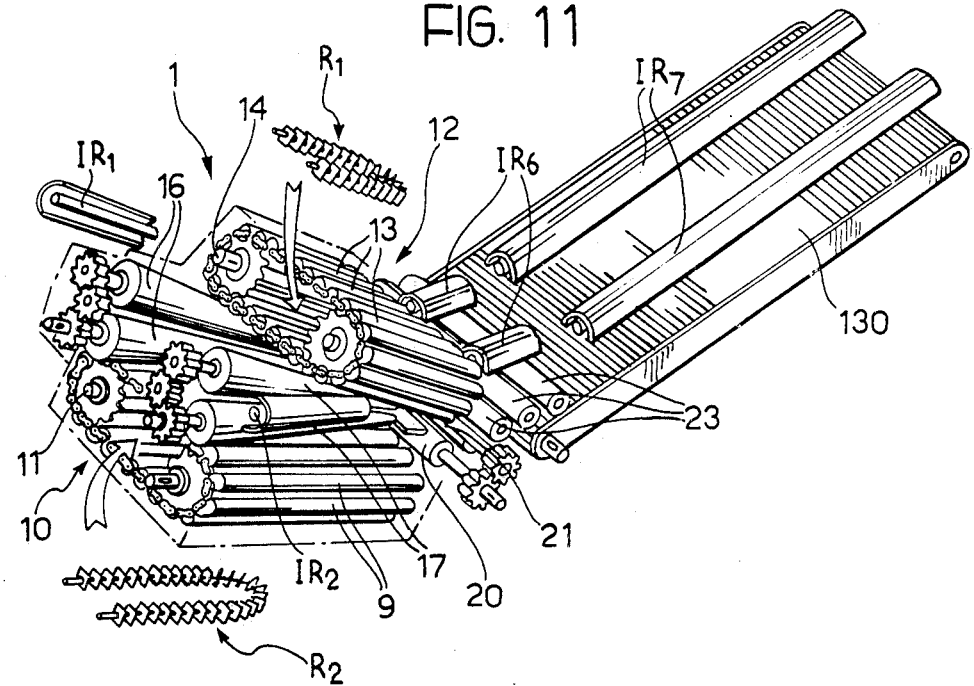
FIG. 11 is a perspective view of some parts of the machine of FIG. 10.

FIG. 10 shows a simplified embodiment of the machine of FIG. 1. In this embodiemnt the thickness reducing station (which was indicated 24 in FIG. 1) is missing: a conveyor belt 130 is pivotally connected to the support structure 2 and can be rotated about an horizontal axis. The inclination of the belt 130 can be manually adjusted, for example by means of a screw device indicated 131. Infrared heat lamps $IR_6$ and $IR_7$ are mounted above the conveyor rollers 23 and the conveyor belt 130, respectively (FIGS. 10, 11). The latter is driven by a motor 132 (FIG. 10) and has a greater length than belt 30 of the machine of FIG. 1 so that in the embodiment shown in FIGS. 10 and 11 a thickness reduction of the drawn product 53 is achieved simply as a consequence of the plastic deformation of said drawn product because of its own weight, any thickness reduction station being thus unnecessary.

Figure 12:
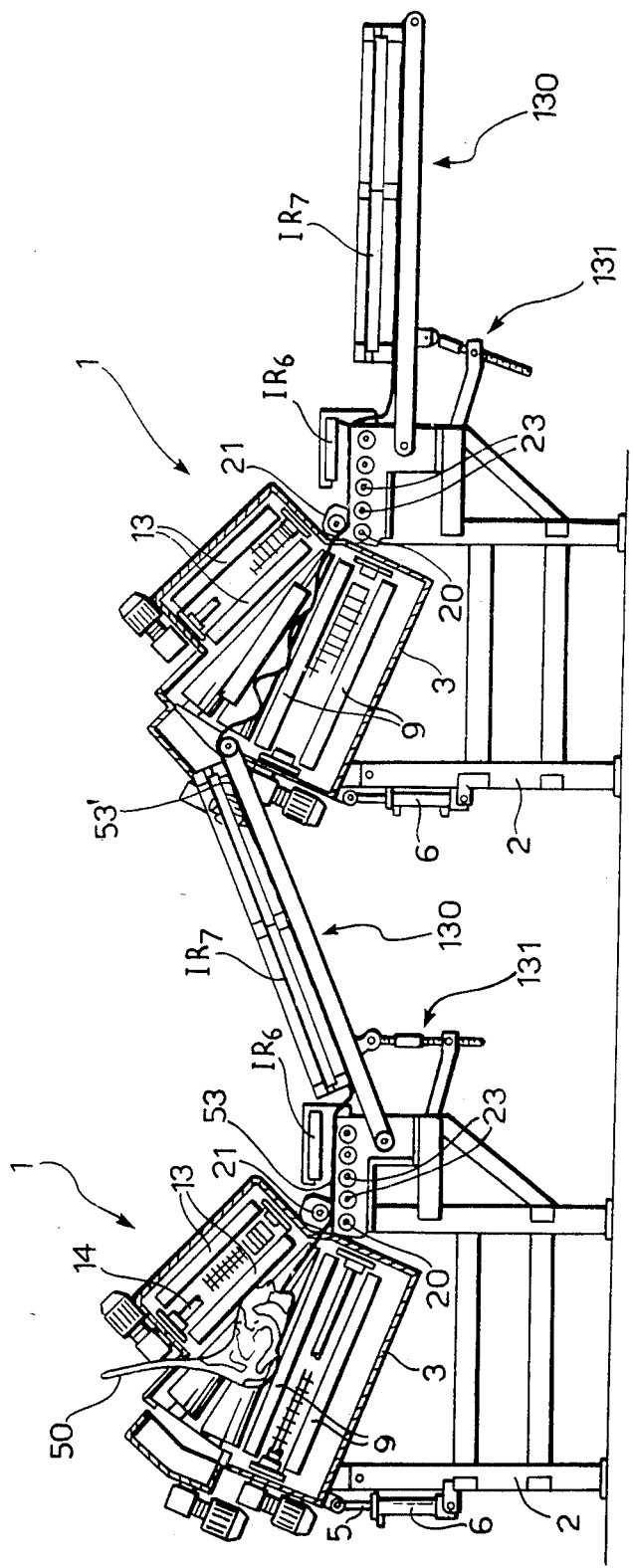
FIG. 12 shows, in a partially sectioned side view, an installation comprising two machines according to FIGS. 10, 11 arranged in cascade.

FIG. 12 shows an installation including two machines according to FIGS. 10 and 11, arranged in cascade.

It is possible, of course, to build up installations which comprise one or more machines of the kind shown in FIGS. 1 and 2 and one of more machines of the kind illustrated in FIGS. 10 and 11, arranged in cascade.

Figure 13:
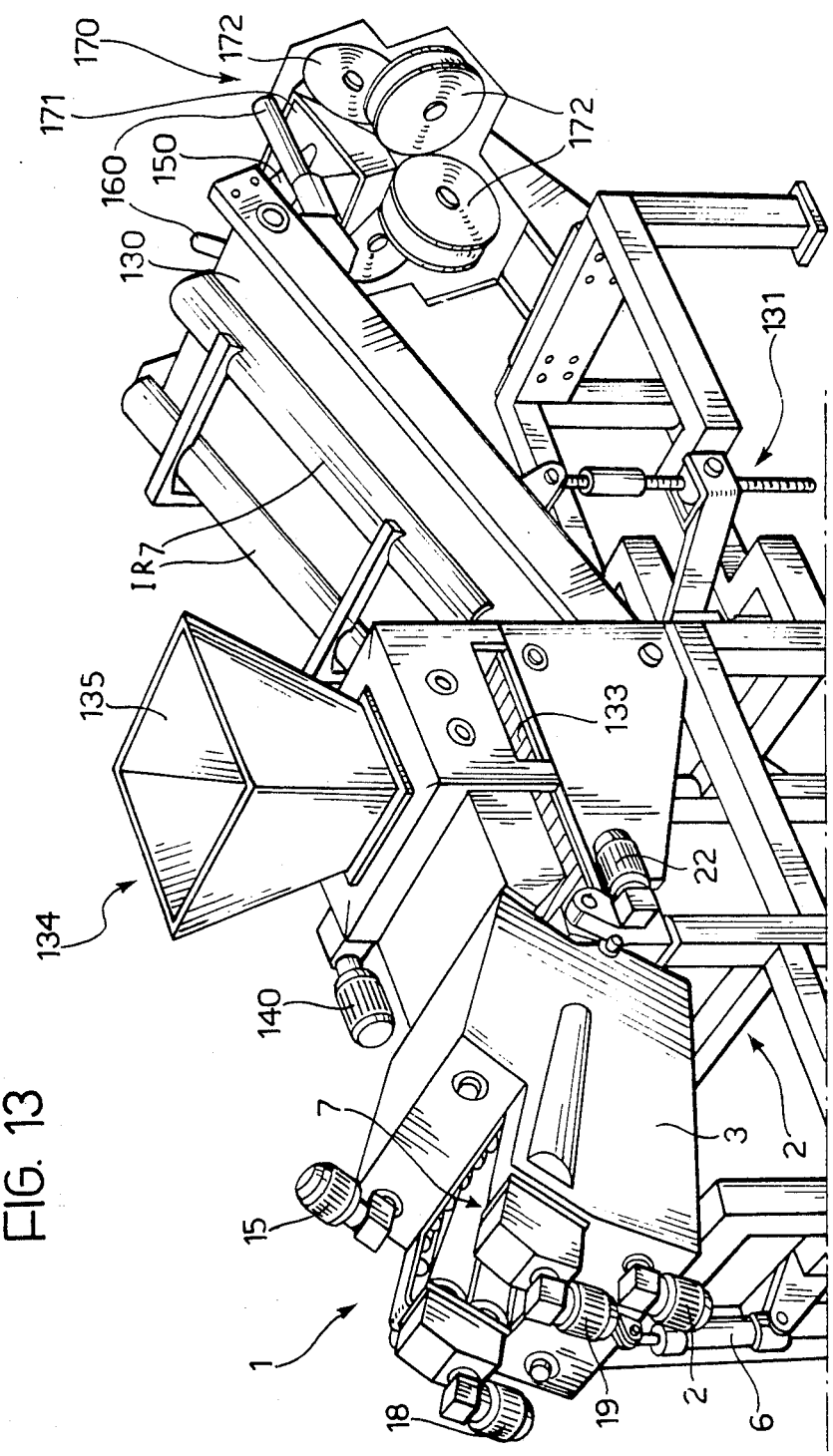
FIG. 13 is a perspective view of still another embodiment of the machine according to the invention.
Figure 14:
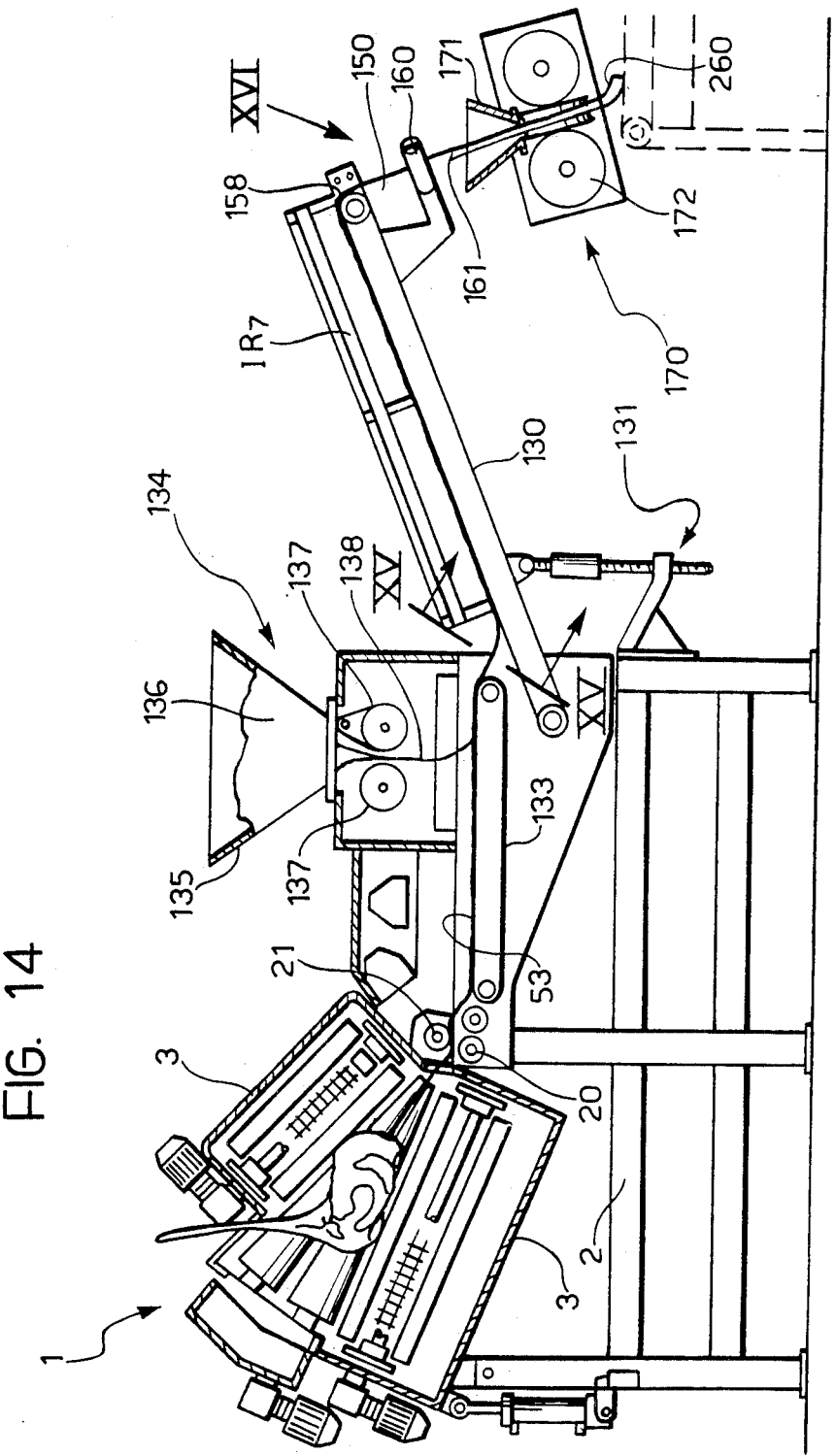
FIG. 14 is a partially sectioned side view of the machine of FIG. 13.

In FIGS. 13 and 14 is it show a still further embodiment of the machine according to the invention. This embodiment is intended to allow the application of an outer plastic reinforcing sweet (sugar) layer onto the drawn product emerging from the extruder. The application of such a layer is especially useful when the drawn product is obtained by means of a plurality of machines arranged in cascade: in this case the sweet outer layer of the drawn product may be too thin and delicate in view of the subsequent tratments it is to be subjected to. Particularly advisable is the application of an outer reinforcing layer (having for example a thickness from 3 to 6–7 mm) when it is desired to convert the final drawn product into an essentially cylindrical strand, in the way described here below.

In the variant according to FIGS. 13 and 14, instead of the conveyor rollers 23 an essentially horizontal conveyor endless belt 133 (driven by a motor not shown) is provided. Above the belt 133 a device 134 for the preparation of the plastic sweet reinforcing layer is mounted; the said device comprises a hopper 135 through which a mass of plastic sugar (indicated 136 in FIG. 14) descends toward parallel laminating heated rolls 137, rotating in opposite directions under the action of a motor 140 (FIG. 13). From between these rollers a thin layer 138 of plastic sugar descends, which comes in contact with and adheres to the drawn product 53.

Figure 15:
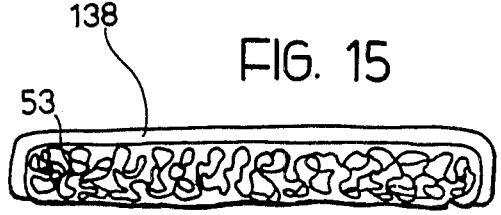
FIG. 15 is a sectioned view taken along the line XV—XV of FIG. 14.

Conveniently, the width of the reinforcing layer or cover 138 is essentially equal to the width of the drawn product 53 plus twice the thickness of said drawn product, so that the layer may thus come in contact with and adhere to the upper face and the side edges of the drawn product, as can be seen in FIG. 15.

The drawn product and the sugar layer thereto applied pass from the horizontal conveyor belt 133 onto the inclined conveyor belt 130: while ascending on that belt they are kept in a plastic condition by heat lamps $IR_4$ (FIG. 14).

Figure 16:
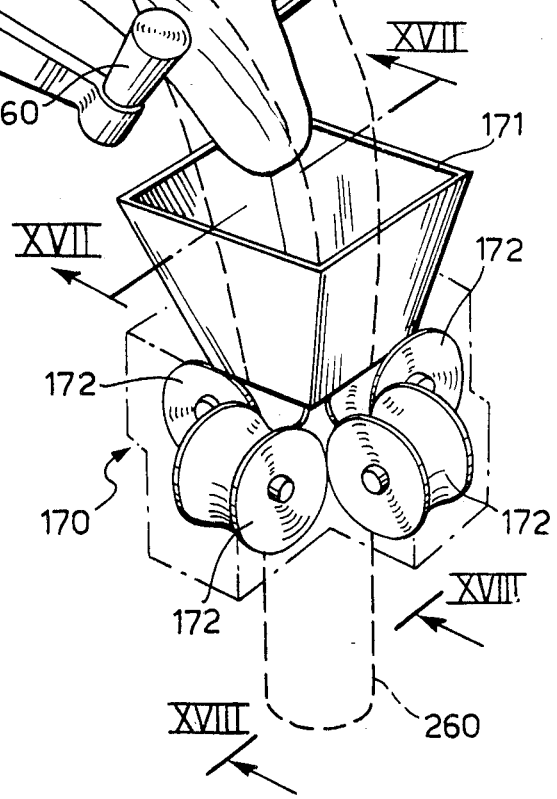
FIG. 16 is a perspective view of a portion of the machine of FIG. 14.
Figure 17:
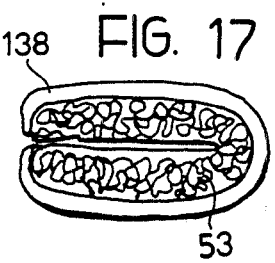
FIGS. 17, 18 are sections taken along the lines XVII—XVII and XVIII—XVIII of FIG. 16, respectively.
Figure 18:
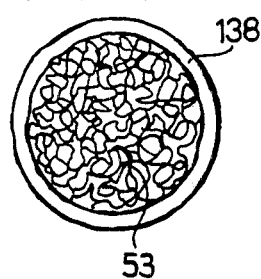

A member 150, shaped like a cycle-saddle, is mounted adjacent the upper end of the conveyor 130, as can be seen in particular in FIG. 16: the drawn product 53 and the sugar layer 138 flow on the saddle-like member 150 and get deformed by gradually folding, as it can be seen in FIG. 17, in two parts which join together to form a strand 161 (FIG. 16) of inner stratified material from the drawn product 53 completely envelopped at its periphery by the sugar reinforcing layer 138. The strand 161 may be then conveniently fed to a strand shaper 170 of a conventional type for example comprising a hopper 171 and four cross-mounted shaping wheels or rollers 172, each with a groove having a profile which is a quarter of a circle. The strand 260 coming out from the shaper 170 has a circular cross section, as can be seen in FIG. 18.

Conveniently, in order to guide the flow of the drawn product 53 on the saddle-like member 150, on both sides of said member two idle guide rollers 160 are provided, supported by the stationary structure of the conveyor belt 130.

The cylindrical strand 260 may be thereafter fed to a moulder or cutter machine for its further treatment, to get therefrom sweets, bars and the like.

The machine described with reference to FIGS. 13 and 14 can be used alone, or as end machine of an installation including one or more machines of the kinds previously described.

The machines described above, used alone or in a cascade arrangement with another, may be incorporated in an installation for the production of sweets and confectionery bars and, not requiring the intervention of an operator, allow the complete automation of the production cycle for such product.

I claim:

1. A machine for preparing a semi-finished confectionery product comprising a sweet outer layer within which thin sweet layers alternate with randomly oriented thin layers of a filling, from a strand comprising a sweet outer part which is in a palstic state but can crystallize on cooling, and which surrounds a core constituted by a filling; the machine comprising an extruder substantially in the form of a hopper, with a loading aperture for the introduction and accumulation of the strand and a drawing aperture towards which the accumulated strand descends under gravity to form a heterogeneous mass with a sweet plastic surface layer; said extruder having inner walls comprising surfaces which are moveable so as to exert on the sweet surface layer of this mass a massaging action which tends to impart to this surface layer a flowing movement substantially around the direction of advance of the mass and drive means for effecting the movement of these surfaces.

2. A machine according to claim 1, wherein said extruder comprises:
a support structure;
first and second pluralities of rollers which are parallel, rotatable about respective axes, and connected together in such a way as to form first and second chains which face each other and extend between respective pairs of shafts carried by the support structure, these chains of rollers converging towards the drawing aperture at a predetermined angle to each other; at least one rotatable conical roller being arranged between the corresponding ends of the two chains of rollers and also converging towards the drawing aperture; the facing portions of the two chains of rollers and of the conical rollers defining a substantially frusto-pyramidal zone into which the strand is introduced and accumulates; the said drive means being prearranged to rotate the chains of rollers and the cones in the same direction in use, whereby the chains of rollers and the cones tend to impart to the sweet surface layer of the mass a flowing movement in the opposite direction.

3. A machine according to claim 2, wherein respective pairs of superposed conical rollers are arranged between the corresponding ends of the chains of rollers, the angle of opening of which corresponds substantially to half the angle formed by the chain rollers.

4. A machine according to claim 3, wherein the extruder is provided with heating means.

5. A machine according to claim 4, wherein the section-reducing station comprises an array of pairs of cylinders opposing each other at distances which decrease progressively in the direction of advance of the drawn product emerging from the extruder.

6. A machine according to claim 2 wherein a station for reducing the section of the drawn product emerging from the extruder is provided at the output of said extruder.

7. A machine according to claim 6 wherein the section reducing station for the drawn product is provided with heating means.

8. A machine according to claim 7 wherein a pair of drive rollers extending transverse the direction of output of the drawn product form the extruder is provided between the extruder and the section reducing station to facilitate the extraction of the drawn product from the extruder.

9. A machine according to claim 6 wherein an endless conveyor belt is provided at the output of the section reducing position.

10. A machine according to claim 1 wherein downstream of the output aperture of said extruder means are provided for applying a sweet reinforcing plastic layer onto at least a surface portion of the drawn product coming out from the extruder.

11. A machine according to claim 10 wherein the said means for the application of a reinforcing layer are adapted to apply a sugar layer onto the upper surface and the side edges of the said drawn product.

12. A machine according to claim 11 including shaper means downstream of the said reinforcing layer, applying means to fold the drawn product and its reinforcing layer so as to make the two longitudinal halves of the lower face of the drawn product joint and adhere, whereby downstream of said shaper means a strand completely enveloped in said reinforcing layer is obtained.

13. A machine according to claim 12 including downstream of said reinforcing layer applying means, a saddle-like shaping member to receive on itself and make the drawn product fold under the action of its own weight.

* * * * *